W. H. BUSTIN.
Hames for Harness.
No. 4,883.
Reissued April 30, 1872.
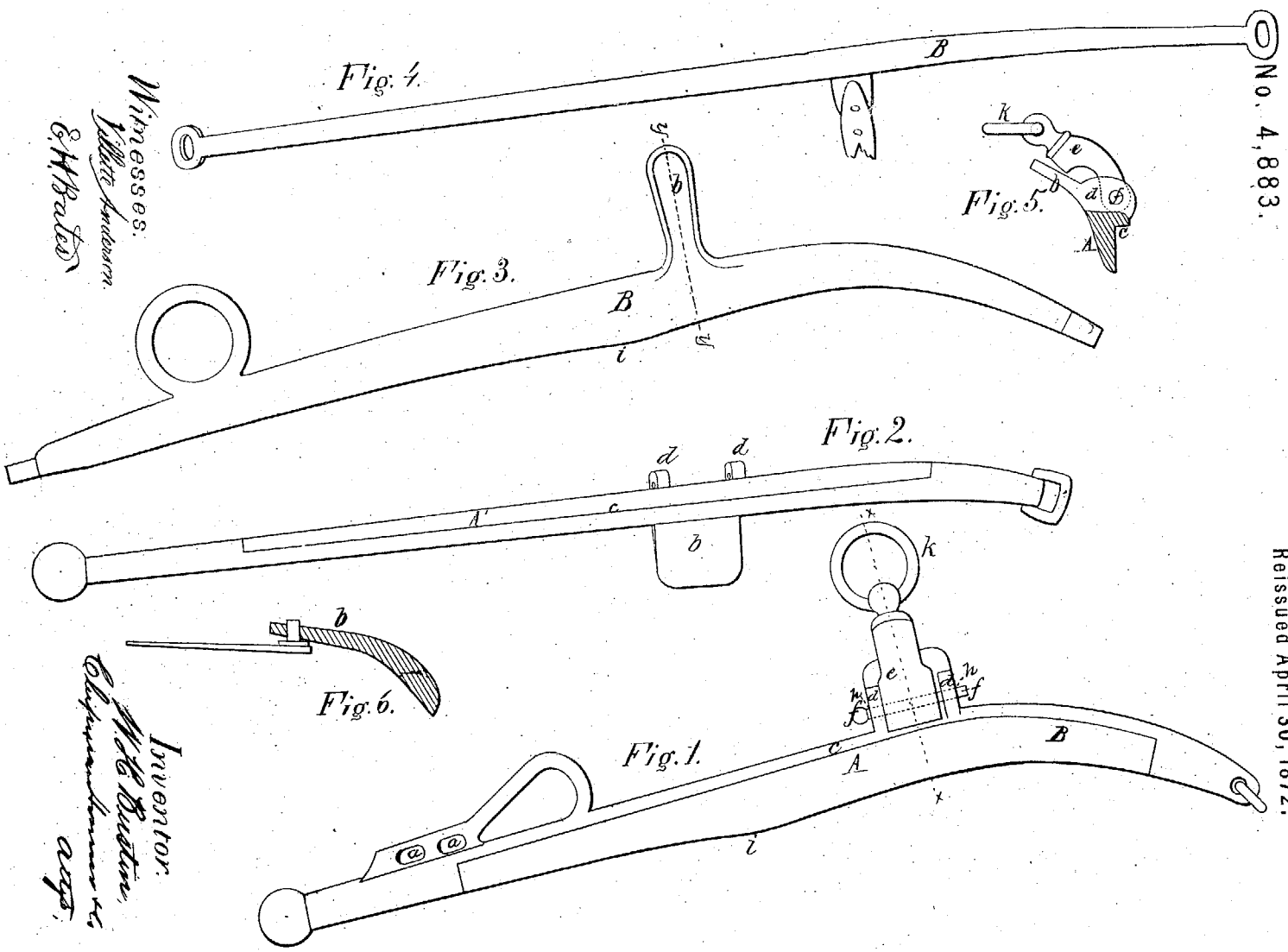
Witnesses.
Villette Andersen.
E. H. Bates
Inventor.
W. H. Bustin,
Chipman Hanner & Co.
attys.

UNITED STATES PATENT OFFICE.

WILLIAM H. BUSTIN, OF BOSTON, MASSACHUSETTS.

IMPROVEMENT IN HAMES FOR HARNESS.

Specification forming part of Letters Patent No. 89,288, dated April 27, 1869; reissue No. 4,883, dated April 30, 1872.

*To all whom it may concern:*

Be it known that I, W. H. BUSTIN, of Boston, in the county of Suffolk and State of Massachusetts, have invented certain new and useful Improvements in Hames for Harness; and I do hereby declare that the following is a full, clear, and exact description thereof, reference being had to the accompanying drawing and to the letters of reference marked thereon making a part of this specification.

My invention has relation to hames for harness; and it consists in constructing the hames with a projecting plate having eyes for attaching the clip or tug. It also consists in the form of the hame-iron, which is made large and massive at the center, or where the eye-plate above mentioned is joined; and further, in the series of strap-loops at the upper end of hame-iron, by means of which the hames can be readily adjusted to collars of different sizes.

In the accompanying drawing, Figure 1 is a front view of one part of a pair of draft-hames. Fig. 2 is an edge view of the same. Fig. 3 is a front view of one part of a carriage-hame. Fig. 4 is an edge view of the same; and Figs. 5 and 6 are transverse sections of the hames through the lines *x x* and *y y*.

The hames, as represented on the drawing, are constructed of metal, or part metal and part wood, and are provided with strap-loops *a* at their upper end, and also projections *b* at their lower parts, to which the traces are attached. A A′ represent one part or half of a pair of hames. Those marked A′ have a flanch, *c*, upon them on their outer edges, said flanches projecting at a right angle from the bodies of the hames. These hames have lugs *d d* attached to them, at the junctions of the projections *b* with the flanches *c*, and the link *e* is secured between these lugs by a pin, *f*, passing through the openings *h*. The outer ends of the link *e* has a ring, *k*, secured to it. The traces are attached to these rings; or, if tug-straps are used, they may be attached directly to the pin or bolt *f*. The projection *b* prevents the collar from being worn, as the links of a trace-chain or a tug-strap cannot come in contact with it, thus protecting the collar from wear by the traces or tug. At the point B or draft a swell or re-enforcement of metal is made, by which construction great strength is gained in this place, where ordinary hames always break and bend. This swell of metal at this point may be effected in the ordinary manner of re-enforcing metallic bars. The hame is curved at its bottom, as shown at *i* in the Figs. 1 and 3, to fit the curvature of the bottom in the collar, and the inner edge is formed to closely fit into the grooves of the collar. The upper part of the hames is provided with a series of strap-holes marked *a*, for the purpose of adjusting the straps up and down, to suit different-sized collars. By this means, also, the hames can be strapped directly across the top of the collar, keeping it narrow and close to the horse's shoulder-blade.

My invention, therefore, consists in so constructing a hame that it will fully answer the above requisitions by being light, strong, durable, and of the shape to be retained in the groove of the collar.

I claim as my invention—

1. The hame-iron A or A′, constructed as herein described, having the swell or convexity *i* on the inner or concave side, substantially as and for the purpose specified.

2. The hame-iron, having a series of strap-loops cast with it at its upper end, substantially as specified.

3. The hame A′, constructed with a flange, *c*, and projecting plate *b*, and lugs *d*, in the manner and for the purpose specified.

In testimony that I claim the above I have hereunto subscribed my name in the presence of two witnesses.

WILLIAM H. BUSTIN.

Witnesses:

JOSEPH CRAFTS,

JOEL BARNARD, Jr.